(12) United States Patent
Nagaraja

(10) Patent No.: US 8,553,718 B2
(45) Date of Patent: Oct. 8, 2013

(54) METHOD AND APPARATUS FOR ADAPTIVE MAC LAYER FRAGMENTATION AND HARQ CHANNEL IDENTIFIER ASSIGNMENT

(75) Inventor: Nagendra Nagaraja, Karnataka (IN)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 12/957,629

(22) Filed: Dec. 1, 2010

(65) Prior Publication Data

US 2011/0243000 A1 Oct. 6, 2011

Related U.S. Application Data

(60) Provisional application No. 61/320,161, filed on Apr. 1, 2010.

(51) Int. Cl.
*H04J 3/16* (2006.01)
(52) U.S. Cl.
USPC .......................................... 370/468
(58) Field of Classification Search
USPC ............... 370/229–238, 310–349, 468–480; 714/748; 375/261
See application file for complete search history.

(56) References Cited

U.S. PATENT DOCUMENTS

| | | | | |
|---|---|---|---|---|
| 7,408,904 | B2 * | 8/2008 | Terry | 370/337 |
| 7,788,566 | B2 * | 8/2010 | Vitebsky et al. | 714/748 |
| 2005/0243762 | A1 * | 11/2005 | Terry et al. | 370/328 |
| 2006/0092972 | A1 * | 5/2006 | Petrovic et al. | 370/469 |
| 2007/0189235 | A1 * | 8/2007 | Chandra et al. | 370/335 |
| 2007/0260956 | A1 * | 11/2007 | Terry et al. | 714/748 |
| 2008/0101285 | A1 * | 5/2008 | Venkatachalam et al. | 370/329 |
| 2008/0301514 | A1 * | 12/2008 | Ma et al. | 714/748 |
| 2009/0028261 | A1 * | 1/2009 | Zhang et al. | 375/261 |
| 2010/0083067 | A1 | 4/2010 | Fujimoto et al. | |
| 2010/0202302 | A1 * | 8/2010 | Cai et al. | 370/252 |
| 2010/0281322 | A1 * | 11/2010 | Park et al. | 714/748 |

FOREIGN PATENT DOCUMENTS

| | | | |
|---|---|---|---|
| EP | 1 211 840 | A1 * | 6/2002 |
| EP | 1722522 | A1 | 11/2006 |
| WO | 2008024340 | A2 | 2/2008 |
| WO | 2008085811 | A2 | 7/2008 |
| WO | 2008120275 | A1 | 10/2008 |

OTHER PUBLICATIONS

International Search Report and Written Opinion—PCT/US2011/031028—ISA/EPO—Jul. 15, 2011.
Zhifeng Tao, et al., "Performance Improvement for Multichannel HARQ Protocol in Next Generation WiMAX System", Wireless Communications and Networking Conference, 2008. WCNC 2008 IEEE, Mar. 31-Apr. 3, 2008.

* cited by examiner

*Primary Examiner* — Kwang B Yao
*Assistant Examiner* — Juvena Loo
(74) *Attorney, Agent, or Firm* — Nerrie M. Zohn

(57) ABSTRACT

Systems and methods are disclosed for adaptively assigning a number of parallel Hybrid Automatic Repeat Request (HARQ) channels based on system parameters such as channel conditions and pending HARQ processes. The channel conditions may comprise at least one of a Channel Quality Indicator (CQI) received from a User Equipment (UE), a number of retransmissions in one or more of the parallel HARQ channels, and a signal to interference plus noise ratio (SINR).

24 Claims, 5 Drawing Sheets

METHOD AND APPARATUS FOR ADAPTIVE MAC LAYER FRAGMENTATION AND HARQ CHANNEL IDENTIFIER ASSIGNMENT

CLAIM OF PRIORITY UNDER 35 U.S.C. §119

The present application for Patent claims benefit of U.S. Provisional Patent Application Ser. No. 61/320,161, entitled, "Method and apparatus for adaptive MAC layer fragmentation and HARQ ACID assignment", filed Apr. 1, 2010, and assigned to the assignee hereof and hereby expressly incorporated by reference herein.

TECHNICAL FIELD

Certain aspects of the present disclosure generally relate to wireless communications and, more particularly, to systems and methods for adaptive MAC layer fragmentation and HARQ Channel Identifier (ACID) assignment.

BACKGROUND

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Optimization of network coverage and service quality are constant goals for wireless network operators.

SUMMARY

Systems and methods are disclosed for adaptively assigning a number of parallel Hybrid Automatic Repeat Request (HARQ) channels based on system parameters such as channel conditions and pending HARQ processes. The channel conditions may comprise at least one of a Channel Quality Indicator (CQI) received from a User Equipment (UE), a number of retransmissions in one or more of the parallel HARQ channels, and a signal to interference plus noise ratio (SINR).

Certain aspects of the present disclosure provide a method for wireless communications. The method generally includes monitoring a channel quality of a physical channel and scaling a number of parallel Hybrid Automatic Repeat Request (HARQ) channels based on the channel quality.

Certain aspects of the present disclosure provide an apparatus for wireless communications. The apparatus generally includes means for monitoring a channel quality of a physical channel and means for scaling a number of parallel Hybrid Automatic Repeat Request (HARQ) channels based on the channel quality.

Certain aspects of the present disclosure provide an apparatus for wireless communications. The apparatus generally includes at least one processor configured to monitor a channel quality of a physical channel and scale a number of parallel Hybrid Automatic Repeat Request (HARQ) channels based on the channel quality.

Certain aspects provide a computer-program product for wireless communications. The computer-program product typically includes a computer-readable medium having instructions stored thereon, the instructions being executable by one or more processors. The instructions generally include code for causing at least one computer to monitor a channel quality of a physical channel and code for causing at least one computer to scale a number of parallel Hybrid Automatic Repeat Request (HARQ) channels based on the channel quality.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
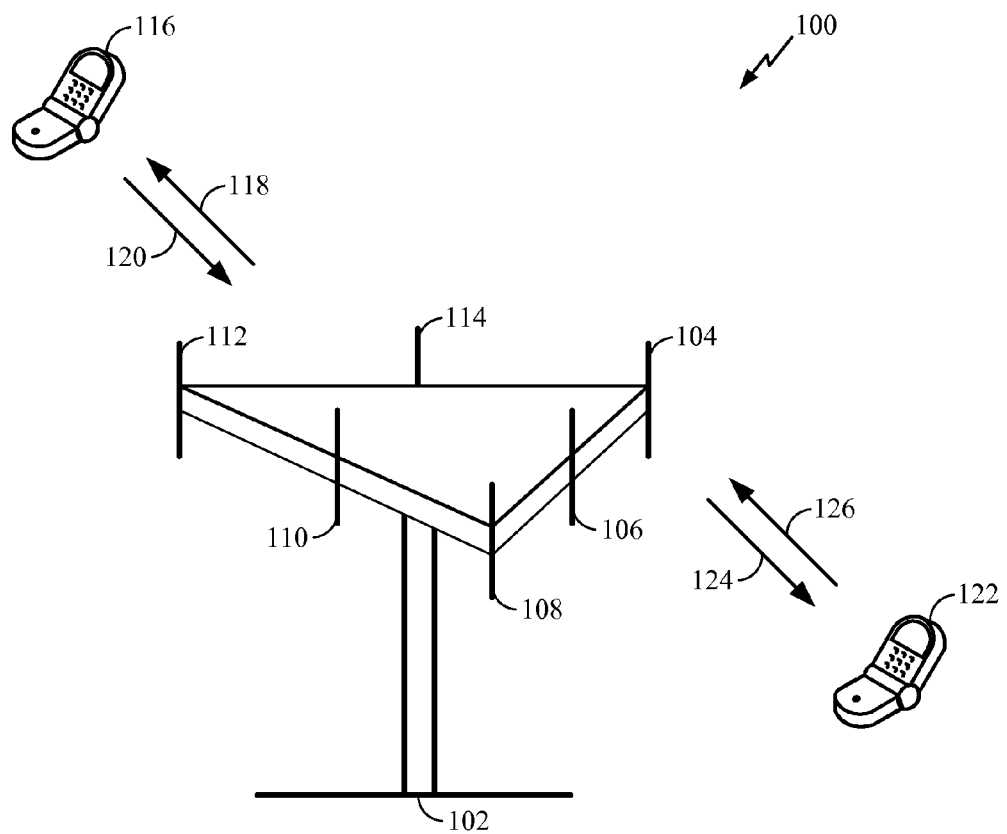
FIG. 1 illustrates a multiple access wireless communication system, in accordance with certain aspects of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system 100 according to one embodiment is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point 102. In the embodiment, antenna groups each are designed to communicate to access terminals in a sector, of the areas covered by access point 102.

In communication over forward links 120 and 126, the transmitting antennas of access point 102 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
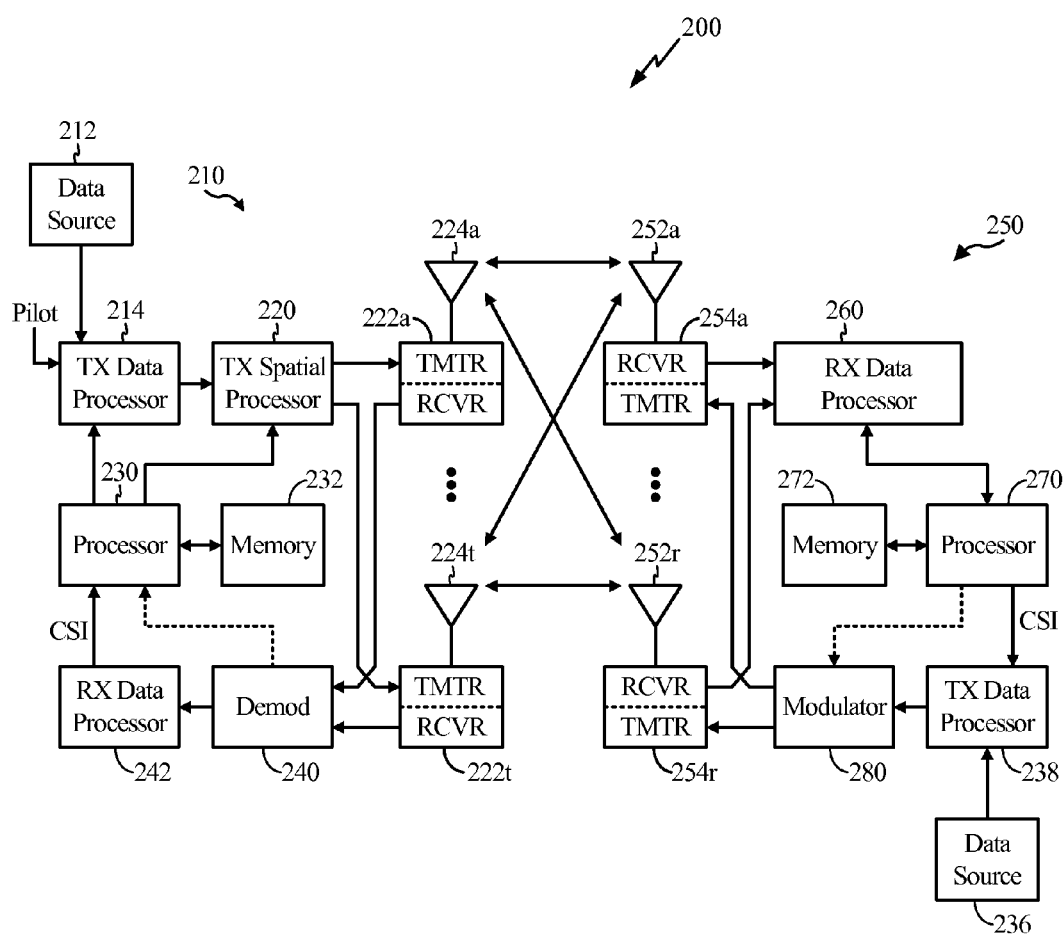
FIG. 2 illustrates a block diagram of a communication system, in accordance with certain aspects of the present disclosure.

FIG. 2 is a block diagram of an embodiment of a transmitter system 210 (also known as the access point) and a receiver system 250 (also known as access terminal) in a system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX Spatial processor 220, which may further process the modulation symbols (e.g., for OFDM). TX Spatial processor 220 then provides NT modulation symbol streams to NT transmitters (TMTR) 222a through 222t. In certain aspects, TX Spatial processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX Spatial processor 220 and TX data processor 214 at transmitter system 210.

A processor 270 periodically determines which pre-coding matrix to use (discussed below). Processor 270 formulates a reverse link message comprising a matrix index portion and a rank value portion. Memory 272 may store data and software for the receiver system 250.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
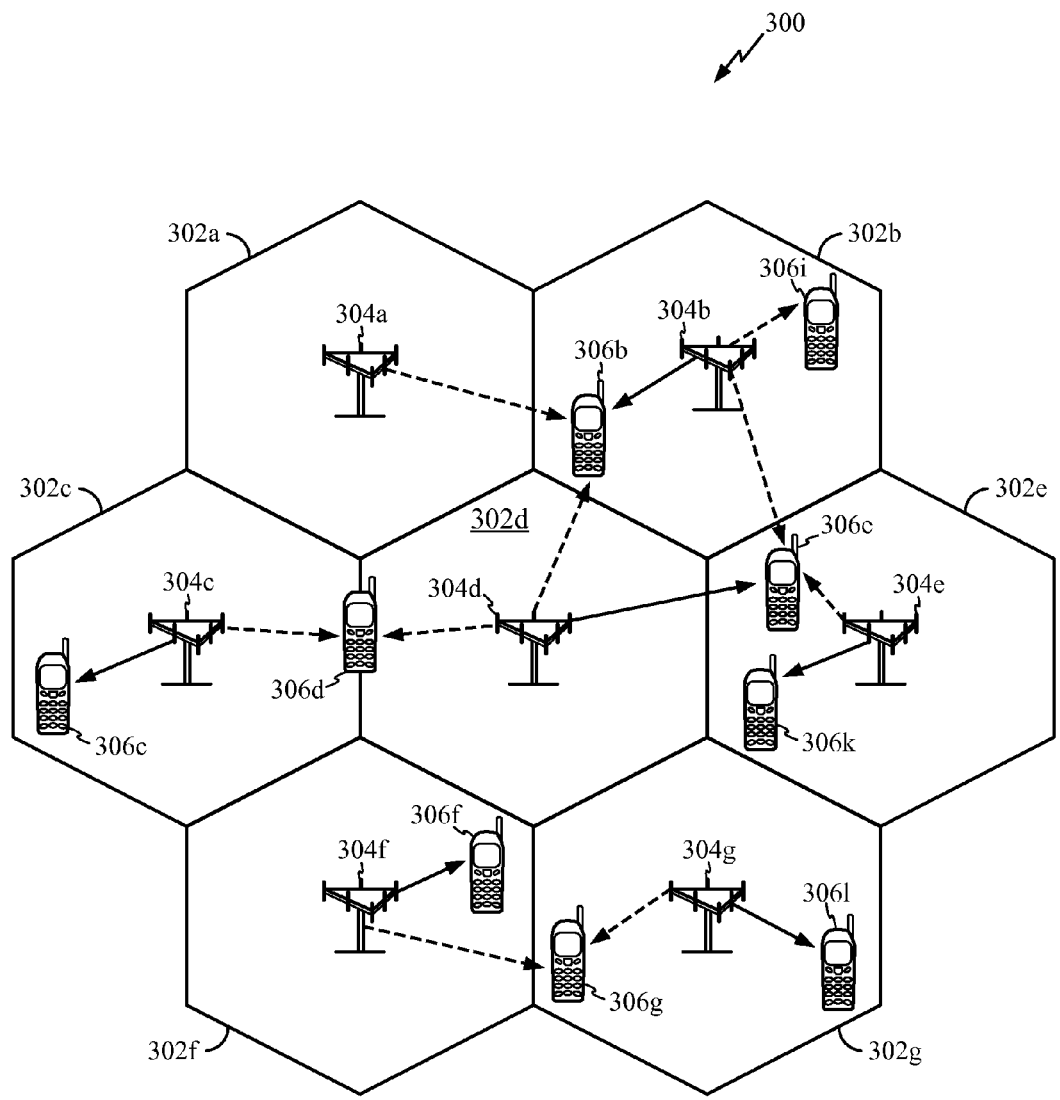
FIG. 3 illustrates an example wireless communication system, in accordance with certain aspects of the present disclosure.

FIG. 3 illustrates an example wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g., to serve one or more frequencies). Various access terminals (ATs) 306, including ATs 306a-306k, also known interchangeably as user equipment (UE) or mobile stations, are dispersed throughout the system. Each UE 306 may communicate with one or more APs 304 on a forward link (FL) and/or a reverse link (RL) at a given moment, depending upon whether the UE is active and whether it is in soft handoff, for example. The wireless communication system 300 may provide service over a large geographic region, for example, macro cells 302a-302g may cover a few blocks in a neighborhood.

Method and Apparatus for Adaptive Mac Layer Fragmentation and HARQ Channel Identifier Assignment Certain aspects of the present disclosure propose methods for adaptively assigning a number of parallel Hybrid Automatic Repeat Request (HARQ) channels based on system parameters such as channel conditions and pending HARQ processes.

It is known in the art that the maximum number of HARQ Channel Identifiers (ACID) may be a bottleneck for throughput of the systems that support HARQ, such as WiMAX (Worldwide Interoperability for Microwave Access) (e.g., IEEE 802.16j/m) and LTE/LTE-A standards.

Increasing the ACID under low signal to interference plus noise ratio (SINR) conditions may result in an increase in the number of HARQ channels which may result in an increase in the number of repetitions. However, increasing the number of parallel HARQ channels may be advantageous under high SINR conditions, but may not provide similar benefits in low SINR conditions.

For certain embodiments of the present disclosure, number of parallel HARQ channels may be adaptively increased or decreased (i.e., scaled) based on channel conditions, while keeping the maximum number of ACIDs constant (e.g., equal to 128). A process similar to the TCP-Reno congestion control mechanism may be used. For certain embodiments, the number of HARQ channels used may be decreased once there is a re-transmission. On the other hand, the number of HARQ channels may be increased under high SINR conditions or high Channel Quality Indicator (CQI) values.

Figure 4:
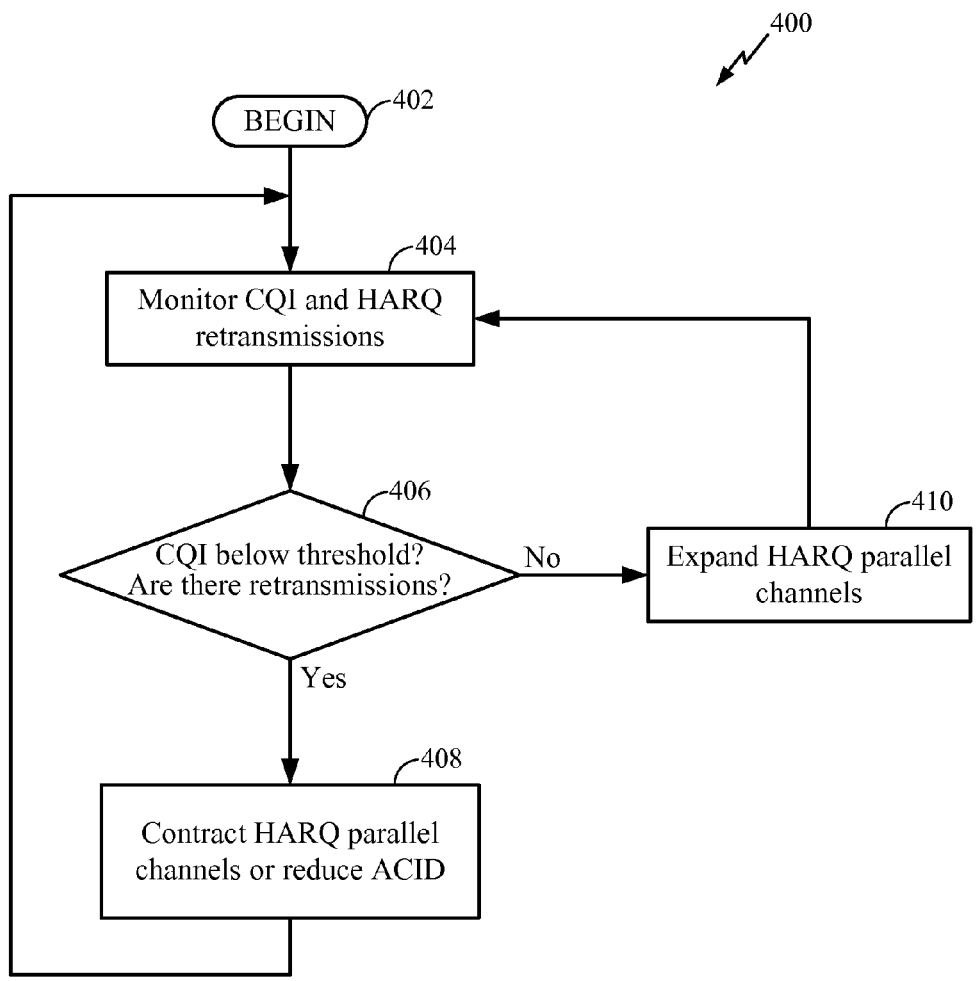
FIG. 4 illustrates an example algorithm for adaptively scaling the number of Hybrid Automatic Repeat Request (HARQ) channels based on channel conditions, in accordance with certain embodiments of the present disclosure.

FIG. 4 illustrates an example algorithm 400 for adaptively scaling the number of HARQ channels based on channel conditions, in accordance with certain embodiments of the present disclosure. At 402, the algorithm may begin by initializing the ACID to a constant. For example, the ACID may be initialized with 128 values, which may correspond to 128 parallel HARQ channels. At 404, a channel quality of a physical channel may be monitored. The channel quality monitored may comprise at least one of a CQI received from a UE and the number of retransmissions in each HARQ channel.

At 406, it may be determined whether the CQI or the number of retransmissions is above or below specified threshold amounts. For example, if the CQI exceeds a first threshold amount, the number of parallel HARQ channels may be expanded at 410. However, if the CQI is lower than a second threshold amount, the number of parallel HARQ channels may be contracted at 408. The first and second threshold amounts may be different. The number of parallel HARQ channels expanded or contracted may be based on one or more factors determined from one or more traffic conditions. For example, the number of parallel HARQ channels may be expanded by doubling in some traffic conditions, and tripling in other traffic conditions. For certain embodiments, the number of parallel channels may be decreased by two times the number of HARQ channels that have a retransmission. For certain embodiments, the number of parallel channels may be reduced based on the decrease in CQI, for example, for every unit dB decrease, the number of HARQ channels may be divided by two.

As another example, if the number of retransmissions exceeds a first threshold amount, the number of parallel HARQ channels may be contracted at 408. However, if the number of retransmissions is lower than a second threshold amount (or the retransmissions stop), the number of parallel HARQ channels may be expanded at 410. For some embodiments, monitoring the channel quality of the physical channel at 404 may comprise monitoring both the CQI and the number of retransmissions in one or more of the parallel HARQ channels. The number of parallel HARQ channels may be increased to a maximum constant, such as 128, when CQI is more than a threshold and there is no retransmission.

The algorithm described in FIG. 4 provides a preferred trade-off between throughput at both low and high SINR conditions of the channel.

Figure 5:
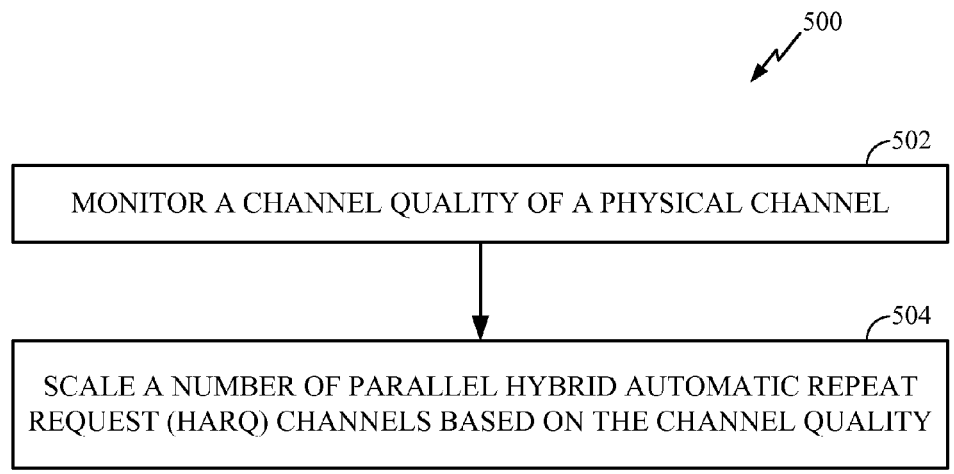
FIG. 5 illustrates example operations for dynamically scaling a number of parallel HARQ channels for pending HARQ processes, in accordance with certain aspects of the present disclosure.

FIG. 5 illustrates example operations 500 in accordance with certain aspects of the present disclosure. The operations 500 may be performed, for example, by a base station in dynamically scaling a number of parallel HARQ channels for pending HARQ processes, according to an aspect of the present disclosure. At 502, the base station may monitor a channel quality of a physical channel. For some embodiments, monitoring the channel quality may comprise monitoring at least one of a CQI received from a UE, a number of retransmissions in one or more of the parallel HARQ channels, and an SINR. At 504, the base station may scale a number of parallel HARQ channels based on the channel quality.

If there is no dynamic scaling of the number of HARQ channels or ACID, the overall performance of the system may suffer. For example, in a system with four parallel HARQ channels and a constant number of ACID channels that does not change with varying channel conditions, if the channel SINR decreases by 40%, there may be 40% more chances of repetitions (i.e., retransmissions). The expected number of repetitions may be written as follows:

$$E = A * B,$$

where E is the increase in the number of retransmissions on a change in SINR, A is the chance of repetitions, and B is the effective number of channels selected because of the varying channel conditions. Accordingly, in this case, where there is a constant number of ACID channels that does not change with the varying channel conditions (i.e., B=4) and a decrease in SINR by 40%, E=0.4*4=1.6.

It should be noted that in the above expression, number of repetitions may be inversely proportional to SINR, with proportionality constant equal to one. However, in general, the constant may take any values.

For some embodiments of the present disclosure, if the number of parallel HARQ channels changes proportional to the decrease in the SINR, changes in the number of parallel channel may be written as follows:

$$\text{delta}(N) = kN * \text{delta}(SINR),$$

where k is a constant, N is the number of parallel HARQ channels, and delta(N) shows the variation in N. Without loss of generality, k may be assumed to be equal to one. Therefore, for a 40% decrease in SINR, the number parallel HARQ channels or ACIDs may be decreased by 40%. In other words, the effective reduction in the number of channels (i.e., delta (N)) may be equal to 4*0.4=1.6.

Therefore, the number of parallel HARQ channels selected (i.e., B) may be reduced by delta(N) (i.e., 4−1.6≈2). Given this reduction, the expected number of repetitions, by reducing the effective number of channels to 2 (i.e., B=2), may be given by:

$$E = 0.4 * 2 = 0.8,$$

where E is the increase in number of repeats based on decrease in SINR by 40% and decrease in number of channels by 40%. Therefore, reducing the number of channels, when there is a decrease in SINR, may reduce the number of retransmissions.

Similarly performance may improve by increasing the number of ACIDs when SINR increases, which may result in an improvement in throughput.

At low SINR conditions, it may be important to avoid extra repetitions which can flood the channel bandwidth. Therefore, dynamically managing ACIDs or the number of parallel HARQ channels may improve the overall performance of the link.

Certain aspects of the present disclosure propose methods for adaptively scaling the number of parallel HARQ channels based on system parameters such as channel conditions, pending HARQ processes, and other parameters.

Figure 5A:
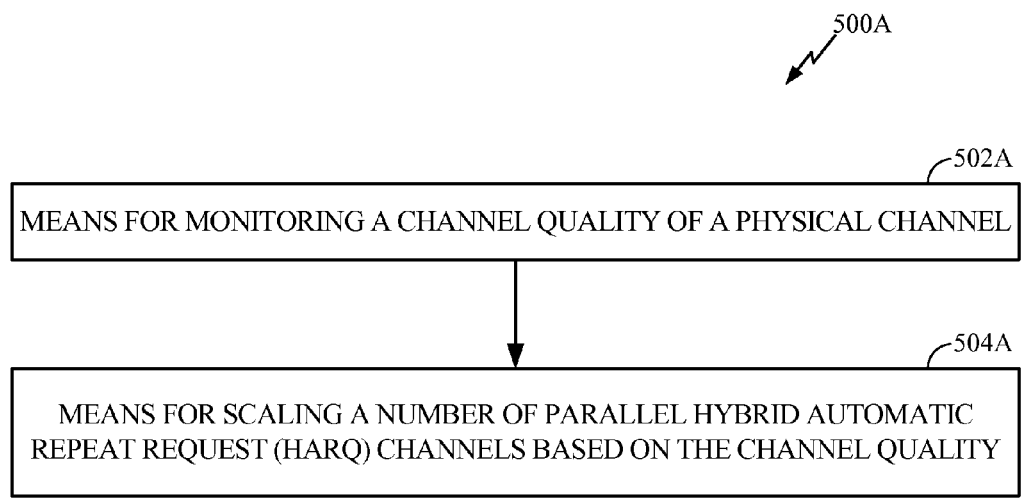
FIG. 5A illustrates example components capable of performing the operations illustrated in FIG. 5.

The various operations of methods described above may be performed by various hardware and/or software component (s) and/or module(s) corresponding to means-plus-function blocks illustrated in the Figures. For example, blocks 502-504 illustrated in FIG. 5 correspond to means-plus-function blocks 502A-504A illustrated in FIG. 5A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising:
    monitoring a channel quality of a physical channel, wherein monitoring the channel quality comprises monitoring a Channel Quality Indicator (CQI); and
    scaling a number of parallel Hybrid Automatic Repeat Request (HARQ) channels based on the channel quality, wherein scaling comprises expanding the number of parallel HARQ channels if the CQI exceeds a first threshold amount and contracting the number of parallel HARQ channels if the CQI is lower than a second threshold amount.

2. The method of claim 1, wherein the first threshold amount and the second threshold amount are different.

3. The method of claim 1, wherein the number of parallel HARQ channels expanded and contracted is based on one or more factors determined from one or more traffic conditions.

4. The method of claim 1, wherein monitoring the channel quality further comprises monitoring a number of retransmissions in one or more of the parallel HARQ channels.

5. The method of claim 1, wherein monitoring the channel quality further comprises monitoring a Signal to Interference plus Noise Ratio (SINR).

6. A method for wireless communications, comprising:
    monitoring a channel quality of a physical channel, wherein monitoring the channel quality comprises monitoring a number of retransmissions in one or more of the parallel HARQ channels; and
    scaling a number of parallel Hybrid Automatic Repeat Request (HARQ) channels based on the channel quality, wherein scaling comprises contracting the number of parallel HARQ channels if the number of retransmissions exceeds a first threshold amount and expanding the number of parallel HARQ channels if the number of retransmissions is lower than a second threshold amount.

7. An apparatus for wireless communications, comprising:
    means for monitoring a channel quality of a physical channel, wherein the means for monitoring the channel quality comprises means for monitoring a Channel Quality Indicator (CQI); and
    means for scaling a number of parallel Hybrid Automatic Repeat Request (HARQ) channels based on the channel quality, wherein the means for scaling comprises means for expanding the number of parallel HARQ channels if the CQI exceeds a first threshold amount and means for contracting the number of parallel HARQ channels if the CQI is lower than a second threshold amount.

8. The apparatus of claim 7, wherein the first threshold amount and the second threshold amount are different.

9. The apparatus of claim 7, wherein the number of parallel HARQ channels expanded and contracted is based on one or more factors determined from one or more traffic conditions.

10. The apparatus of claim 7, wherein the means for monitoring the channel quality further comprises means for monitoring a number of retransmissions in one or more of the parallel HARQ channels.

11. The apparatus of claim 7, wherein the means for monitoring the channel quality further comprises means for monitoring a Signal to Interference plus Noise Ratio (SINR).

12. An apparatus for wireless communications, comprising:
    means for monitoring a channel quality of a physical channel, wherein the means for monitoring the channel quality comprises means for monitoring a number of retransmissions in one or more of the parallel HARQ channels; and
    means for scaling a number of parallel Hybrid Automatic Repeat Request (HARQ) channels based on the channel quality, wherein the means for scaling comprises means for contracting the number of parallel HARQ channels if the number of retransmissions exceeds a first threshold amount and means for expanding the number of parallel HARQ channels if the number of retransmissions is lower than a second threshold amount.

13. An apparatus for wireless communications, comprising:
- at least one processor configured to monitor a channel quality of a physical channel and scale a number of parallel Hybrid Automatic Repeat Request (HARQ) channels based on the channel quality, wherein monitoring the channel quality comprises monitoring a Channel Quality Indicator (CQI) and scaling the number of parallel Hybrid Automatic Repeat Request (HARQ) channels comprises expanding the number of parallel HARQ channels if the CQI exceeds a first threshold amount and contracting the number of parallel HARQ channels if the CQI is lower than a second threshold amount.

14. The apparatus of claim 13, wherein the first threshold amount and the second threshold amount are different.

15. The apparatus of claim 13, wherein the number of parallel HARQ channels expanded and contracted is based on one or more factors determined from one or more traffic conditions.

16. The apparatus of claim 13, wherein monitoring the channel quality further comprises monitoring a number of retransmissions in one or more of the parallel HARQ channels.

17. The apparatus of claim 13, wherein monitoring the channel quality further comprises monitoring a Signal to Interference plus Noise Ratio (SINR).

18. An apparatus for wireless communications, comprising:
- at least one processor configured to monitor a channel quality of a physical channel and scale a number of parallel Hybrid Automatic Repeat Request (HARQ) channels based on the channel quality, wherein monitoring the channel quality comprises monitoring a number of retransmissions in one or more of the parallel HARQ channels, and scaling the number of parallel Hybrid Automatic Repeat Request (HARQ) channels comprises contracting the number of parallel HARQ channels if the number of retransmissions exceeds a first threshold amount and expanding the number of parallel HARQ channels if the number of retransmissions is lower than a second threshold amount.

19. A computer-program product, comprising:
a non-transitory computer-readable medium comprising:
- code for causing at least one computer to monitor a channel quality of a physical channel, wherein monitoring the channel quality comprises monitoring a Channel Quality Indicator (CQI); and
- code for causing at least one computer to scale a number of parallel Hybrid Automatic Repeat Request (HARQ) channels based on the channel quality, wherein scaling the number of parallel Hybrid Automatic Repeat Request (HARQ) channels comprises expanding the number of parallel HARQ channels if the CQI exceeds a first threshold amount and contracting the number of parallel HARQ channels if the CQI is lower than a second threshold amount.

20. The computer-program product of claim 19, wherein the first threshold amount and the second threshold amount are different.

21. The computer-program product of claim 19, wherein the number of parallel HARQ channels expanded and contracted is based on one or more factors determined from one or more traffic conditions.

22. The computer-program product of claim 19, wherein the code for causing the at least one computer to monitor the channel quality further comprises code for monitoring a number of retransmissions in one or more of the parallel HARQ channels.

23. The computer-program product of claim 19, wherein the code for causing the at least one computer to monitor the channel quality further comprises code for monitoring a Signal to Interference plus Noise Ratio (SINR).

24. A computer-program product, comprising:
a non-transitory computer-readable medium comprising:
- code for causing at least one computer to monitor a channel quality of a physical channel, wherein monitoring the channel quality comprises monitoring a number of retransmissions in one or more of the parallel HARQ channels; and
- code for causing at least one computer to scale a number of parallel Hybrid Automatic Repeat Request (HARQ) channels based on the channel quality, wherein scaling comprises contracting the number of parallel HARQ channels if the number of retransmissions exceeds a first threshold amount and expanding the number of parallel HARQ channels if the number of retransmissions is lower than a second threshold amount.

* * * * *